(12) United States Patent
Yoshinaga

(10) Patent No.: US 9,352,535 B2
(45) Date of Patent: *May 31, 2016

(54) COVER MATERIAL

(71) Applicant: TOPPAN PRINTING CO., LTD., Tokyo (JP)

(72) Inventor: Masanobu Yoshinaga, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/430,473

(22) PCT Filed: Sep. 27, 2012

(86) PCT No.: PCT/JP2012/006173
§ 371 (c)(1),
(2) Date: Mar. 23, 2015

(87) PCT Pub. No.: WO2014/049650
PCT Pub. Date: Apr. 3, 2014

(65) Prior Publication Data
US 2015/0246510 A1 Sep. 3, 2015

(30) Foreign Application Priority Data
Sep. 25, 2012 (JP) .................. 2012-211488

(51) Int. Cl.
*B32B 27/08* (2006.01)
*B32B 27/32* (2006.01)
(Continued)

(52) U.S. Cl.
CPC . *B32B 27/08* (2013.01); *B32B 7/12* (2013.01);
*B32B 15/08* (2013.01); *B32B 15/20* (2013.01);
*B32B 27/10* (2013.01); *B32B 27/32* (2013.01);
*B32B 27/36* (2013.01); *C09J 123/08* (2013.01);
*C09J 123/0815* (2013.01); *B32B 2255/06* (2013.01); *B32B 2255/26* (2013.01);
(Continued)

(58) Field of Classification Search
CPC .......... B32B 7/12; B32B 15/08; B32B 27/10; B32B 27/32; B32B 27/08; C09J 123/08; C09J 123/0815
See application file for complete search history.

(56) References Cited

FOREIGN PATENT DOCUMENTS

| JP | 10-138420 | 5/1998 |
|---|---|---|
| JP | 2000-79663 | 3/2000 |

(Continued)

OTHER PUBLICATIONS
International Search Report mailed on Dec. 18, 2012 in corresponding International Patent Application No. PCT/JP2012/006173.

*Primary Examiner* — Betelhem Shewareged

(57) ABSTRACT

A cover material used for a container has a seal part formed from a polypropylene resin. The cover material includes a base material and a sealant layer. The sealant layer has a laminated structure obtained through lamination of a first thermoplastic resin layer, adhesive to the base material, and a second thermoplastic resin layer, adhesive to the seal part formed from the polypropylene resin. Thicknesses of the first thermoplastic resin layer and the second thermoplastic resin layer satisfy: thickness of first thermoplastic resin layer≤thickness of second thermoplastic resin layer. The layer of the second thermoplastic resin has a dispersion structure obtained by dispersing, in the first thermoplastic resin, the second thermoplastic resin that is non-compatible or partially compatible to the first thermoplastic resin such that a ratio l/s of a domain longer diameter l and a domain shorter diameter s of the second thermoplastic resin is within 1.5≤l/s≤10.

9 Claims, 9 Drawing Sheets

(51) Int. Cl.
*B32B 15/08* (2006.01)
*B32B 7/12* (2006.01)
*B32B 27/10* (2006.01)
*C09J 123/08* (2006.01)
*B32B 15/20* (2006.01)
*B32B 27/36* (2006.01)

(52) U.S. Cl.
CPC ..... *B32B2270/00* (2013.01); *B32B 2307/4023* (2013.01); *B32B 2307/41* (2013.01); *B32B 2307/54* (2013.01); *B32B 2307/72* (2013.01); *B32B 2307/75* (2013.01); *B32B 2435/00* (2013.01); *B32B 2435/02* (2013.01); *B32B 2439/40* (2013.01); *Y10T 428/2495* (2015.01); *Y10T 428/24802* (2015.01)

(56) References Cited

FOREIGN PATENT DOCUMENTS

| | | | | |
|---|---|---|---|---|
| JP | 2000-229664 | | 8/2000 | |
| JP | 2000-229664 A | * | 8/2000 | ............ B65D 77/20 |
| JP | 2004-314449 | | 11/2004 | |
| JP | 2005-245399 | | 9/2005 | |

* cited by examiner

COVER MATERIAL

CROSS REFERENCE TO RELATED APPLICATIONS

This application is a U.S. National Stage application, which claims the benefit under 35 U.S.C. §371, of PCT International Patent Application No. PCT/JP2012/006173, filed Sep. 27, 2012, which is based on and claims the foreign priority benefit of Japanese Patent Application No. 2012-211488, filed Sep. 25, 2012, the entire disclosures of which are herein incorporated by reference as a part of this application.

TECHNICAL FIELD

The present invention relates to a cover material used for a container formed from a polypropylene resin or a container having a seal part covered with polypropylene.

BACKGROUND ART

In the field of food packaging, increased usage has been observed for modes of packaging such as cups and trays filled with contents such as instant noodles, jelly, or yogurt. Such cups or trays are generally manufactured using a method such as injection molding or vacuum compression molding a thermoplastic resin such as polystyrene, expanded polystyrene, and polypropylene resins.

With regard to the qualities required for a cover material used in a cup container, a sealant layer which is the innermost layer of the cover material for protecting a content is preferably strongly adhered to the container such as a cup, which is an adherent. On the other hand, an opposite quality of being easily unsealable only upon unsealing is demanded.

In order to satisfy the required qualities described above, various functions have been added to the cover material. One of such functions involves a design of an easily unsealable mechanism. Examples of the easily unsealable mechanism include an inter-layer peeling mechanism and a cohesion peeling mechanism. Among these, the cohesion peeling mechanism is designed by blending, in the thermoplastic resin, a non-compatible type or a partially compatible type thermoplastic resin. The peeling principle behind the cohesion peeling mechanism relates to making use of the small cohesive force of the non-compatible type or the partially compatible type thermoplastic resin blend layer and utilizing a cohesion failure in the non-compatible type or the partially compatible type thermoplastic resin blend layer, instead of rupturing at an interface between the adherent and the sealant at the innermost part of the cover material upon unsealing.

Problems of the cohesion peeling mechanism described above include occurrence of stringiness upon unsealing. Occurrence of stringiness is suppressed by reducing layer thickness of an easily unsealable layer (thermoplastic resin blend layer) as much as possible. Alternatively, since the easily unsealable layer generally forms a sea-island structure in which a fine spherical domain phase is dispersed in a matrix phase, it is also possible to suppress occurrence of stringiness through morphological designing such as reducing the dispersion diameter of the domain phase as much as possible. However, thinly forming the thermoplastic resin blend layer is an extremely difficult technology in terms of film thickness control, resulting in deteriorated processability. Furthermore, since finely dispersing the domain phase significantly improves interface adhesiveness of two members, unsealing strength becomes strong and it is difficult to provide the ease of unsealing.

CITATION LIST

Patent Literature

[PTL 1] Japanese Laid-Open Patent Publication No. 2005-335818 (Application No. 2005-245399)

SUMMARY OF THE INVENTION

Problems to be Solved by the Invention

An objective of the present invention is to provide a cover material that can reduce occurrence of stringiness upon unsealing without compromising the ease of unsealing.

Solution to the Problems

In a cover material used for a container formed from a polypropylene resin or a container having a seal part formed from a polypropylene resin, the cover material includes a base material and a sealant layer. The sealant layer has a laminated structure obtained through lamination of a layer of a first thermoplastic resin having adhesiveness with respect to the base material, and a layer of a second thermoplastic resin having adhesiveness with respect to the seal part. Thicknesses of the layer of the first thermoplastic resin and the layer of the second thermoplastic resin satisfy: a thickness of the layer of the first thermoplastic resin≤a thickness of the layer of the second thermoplastic resin. The layer of the second thermoplastic resin has a dispersion structure obtained by dispersing, in the first thermoplastic resin, the second thermoplastic resin that is non-compatible or partially compatible with respect to the first thermoplastic resin such that a ratio $l/s$ of a domain longer diameter $l$ and a domain shorter diameter $s$ of the second thermoplastic resin falls in a range of $1.5 \leq l/s \leq 10$.

Advantageous Effects of the Invention

With the present invention, it is possible to provide a cover material that is superior in terms of the ease of unsealing and can reduce occurrence of stringiness upon unsealing.

DESCRIPTION OF EMBODIMENTS

Figure 1:
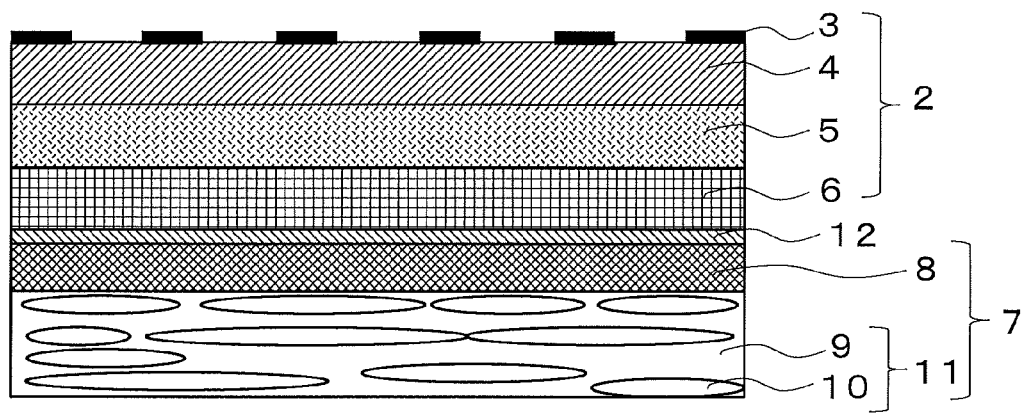
FIG. 1 is a cross-sectional schematic diagram showing one example of a layer configuration of a cover material according to the present invention.

FIG. 1 is a cross-sectional schematic diagram showing one example of a layer configuration of a cover material 1 according to the present invention. As shown in FIG. 1, the cover material 1 is formed by laminating a sealant layer 7 on a surface on one side of a base material 2.

For example, the base material 2 includes a paper layer 4, a printing ink layer 3 formed by printing on a surface on one side of the paper layer 4, and a metallic foil layer 6 laminated on the other surface of the paper layer 4 via an adhesion resin layer 5. As the adhesion resin layer 5, for example, polyethylene resins, and acid copolymers such as ethylene-acrylic acid copolymer resins and ethylene-methacrylic acid copolymer resins can be used. As the metallic foil layer 6, an aluminium foil can be suitably used. The layer configuration of the base material 2 is not limited to the configuration described above, and may be a configuration obtained by, for example, laminating two layers, a paper layer and a PET layer having provided thereon light-blocking printing. If necessary, an adhesive layer may also be laminated. Furthermore, the material of the paper layer 4 is not particularly limited.

The sealant layer 7 includes a first thermoplastic resin layer 8 formed on a base material side and a second thermoplastic resin layer 11 disposed on the outermost surface. The sealant layer 7 is formed by co-extruding a forming material of the first thermoplastic resin layer 8 and a forming material of the second thermoplastic resin layer 11 on a surface on one side of the base material 2. In order to ensure adhesion between the base material 2 and the sealant layer 7, an anchor coating layer 12 may be disposed on the surface on one side of the base material 2 if necessary. The thicknesses of the first thermoplastic resin layer 8 and the second thermoplastic resin layer 11 are set so as to satisfy: thickness of the first thermoplastic resin layer 8≤thickness of the second thermoplastic resin layer 11. When the thickness of the second thermoplastic resin layer 11 is smaller than the thickness of the first thermoplastic resin layer 8, the first thermoplastic resin layer 8 is exposed to a heat-seal surface, and thereby adhesion becomes inhibited. In terms of adhesive strength and cost, the thicknesses of the first thermoplastic resin layer 8 and the second thermoplastic resin layer 11 are preferable equal.

As the first thermoplastic resin layer 8, a layer that can be used is formed from, for example, at least one type of resin such as ethylene-acrylic acid copolymer resins, ethylene-methacrylic acid copolymer resins, ethylene-acrylic acid-acrylic acid ester terpolymer resins, ethylene-methacrylic acid-acrylic acid ester terpolymer resins, ethylene-acrylic acid-methacrylic acid ester terpolymer resins, ethylene-methacrylic acid-methacrylic acid ester terpolymer resins, ethylene-acrylic acid ester-acid anhydride (such as maleic anhydride) terpolymer resins, and ethylene-methacrylic acid ester-acid anhydride (such as maleic anhydride) terpolymer resins.

The second thermoplastic resin layer 11 is a resin layer obtained by blending a first thermoplastic resin 9 and a second thermoplastic resin 10. In the cover material 1, when cohesion peeling is to be employed as the unsealing mechanism, the second thermoplastic resin 10 that is to be blended in the second thermoplastic resin layer 11 is a resin that is completely non-compatible or partially compatible with respect to the first thermoplastic resin 9. Furthermore, in the present invention, when a container such as a cup is formed from a polypropylene resin or a seal part is covered with a polypropylene resin, a linear low density polyethylene and a low density polyethylene can be used as the first thermoplastic resin 9, and a polybutene-1 can be used as the second thermoplastic resin 10.

The blend ratio of the linear low density polyethylene, the low density polyethylene, and the polybutene-1 is preferably in a range of 10 to 30 wt % for the linear low density polyethylene, 40 to 60 wt % for the low density polyethylene, and 10 to 30 wt % for the polybutene-1. When the blend ratio of the linear low density polyethylene is lower than 10 wt %, the seal strength cannot be increased; whereas when the blend ratio of the linear low density polyethylene is higher than 30 wt %, the ease of unsealing becomes inferior. Furthermore, when the blend ratio of the polybutene-1 is lower than 10 wt %, the seal strength becomes too strong; whereas when the blend ratio of the polybutene-1 is higher than 30 wt %, stringiness easily occurs upon unsealing.

The linear low density polyethylene used for the second thermoplastic resin layer 11 preferably has a density in a range of 0.900 to 0.915 g/cm$^3$ and a melt flow rate (MFR) in a range of 5 to 30 g/10 min. In addition, the low density polyethylene used for the second thermoplastic resin layer 11 preferably has a melting point of 100° C. to 115° C. and an MFR of 15 to 40 g/10 min. Furthermore, the polybutene-1 used for the second thermoplastic resin layer 11 preferably has a melting point of 125° C. and a density of 0.915 g/cm$^3$.

In addition, an elastomer such as ethylene-propylene or ethylene-butene copolymers may be added to the second thermoplastic resin layer 11 as a peel strength regulator. By adding the peel strength regulator, it is possible to obtain a cover material having excellent ease of unsealing regardless of variation in the heat-seal temperature by reducing the temperature dependency of the peeling strength when heat-sealing a container, and improve the exterior thereof after the cover material is peeled off the container. The blending ratio of the peel strength regulator is preferably 10 to 20 wt %.

In particular, adding an ethylene-butene copolymer is preferable for improving the ease of unsealing. In that case, the blend ratio of the polybutene-1 is preferably 10 to 20 wt %.

Figure 2A:
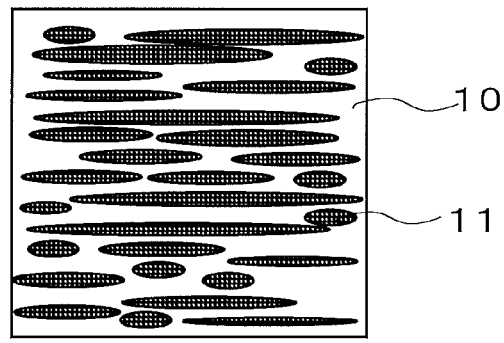
FIG. 2A shows a state in which a domain of a second thermoplastic resin is dispersed in an elliptical shape or a flat shape.
Figure 2B:
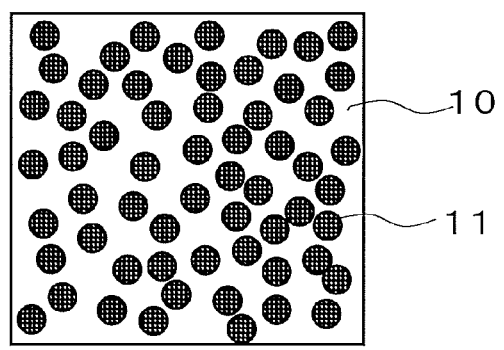
FIG. 2B shows a state in which the domain of the second thermoplastic resin is dispersed perfectly spherically.

As the morphology of the second thermoplastic resin layer 11, a domain diameter l/s (l: longer diameter of a domain, s: shorter diameter of a domain) of the second thermoplastic resin 10 dispersed in the first thermoplastic resin 9 which forms the base is preferably within a range of $1.5 \le l/s \le 10$. In the second thermoplastic resin 10, when the second thermoplastic resin 10 whose domain diameter falls within the above described range is contained by 50% or more in the whole, the ease of unsealing becomes excellent and reduction in occurrence of stringiness can be achieved. When the second thermoplastic resin 10 has a domain diameter l/s within the above described range and is dispersed in an elliptical shape or flat shape as shown in FIG. 2A; the size of the area at which a matrix phase breaks upon unsealing can be reduced and the strength required upon unsealing can be suppressed when compared to a case where the second thermoplastic resin 10 is dispersed in a perfectly spherical manner (l/s=1) as shown in FIG. 2B. When the domain diameter of the second thermoplastic resin 10 is in a range of l/s>10, extension of the second thermoplastic resin 10 upon unsealing of the cover material 1 occurs, which possibly causes stringiness. The second thermoplastic resin 10 has a domain diameter l/s in a range of 1.5≤l/s≤10. Further preferably, as described in the following, the first thermoplastic resin 9 is set to have resin physical properties of a tensile breaking strength of 5 to 20 MPa and a tensile break elongation of not larger than 600% in accordance with JIS.K7113. By setting the resin physical properties of the first thermoplastic resin 9 in the above described ranges, it is possible to obtain a synergy between an advantageous effect of reducing the breaking area in the matrix phase and an advantageous effect of resolving stringiness.

In order to form the morphology described above, it is necessary to adjust the MFR ratio of the first thermoplastic resin 9 and the second thermoplastic resin 10 at 190° C. and 21.168 N based on JIS.K7210, or melt viscosity ratio therebetween at an actual processing temperature and shear rate range. However, in general, when the viscosity of the second thermoplastic resin 10 is higher than the viscosity of the first thermoplastic resin 9 under molding-processing temperature and shear rate, the above described morphology can be formed. Thus, there would be no problems if the melt viscosity of the first thermoplastic resin 9 is smaller than the melt viscosity of the second thermoplastic resin 10 at a membrane formation condition. In particular, a larger difference in melt viscosities of the first thermoplastic resin 9 and the second thermoplastic resin 10 is preferable since the second thermoplastic resin 10 will be dispersed in an elliptical shape or a flat shape.

As described above, the first thermoplastic resin 9 preferably has a tensile breaking strength of 5 to 20 MPa and a tensile break elongation of not larger than 600% in accordance with JIS.K7113. Here, the measurement test pieces and measuring conditions for the tensile break elongation and tensile breaking strength in accordance with JIS.K7113 are in conformance with JIS.K7113. For example, when a resin that is to be measured is a low density polyethylene resin, the test is performed with a No. 2 test piece having a thickness of 2.0±0.2 mm under a condition of testing rate of 200 mm/min.

When the tensile breaking strength of the first thermoplastic resin 9 is smaller than 5 MPa, the strength thereof becomes too low as a resin, and a seal strength may not be obtained. Furthermore, when the first thermoplastic resin 9 has a tensile breaking strength that is larger than 20 MPa and a tensile break elongation that is larger than 600%, stringiness may occur upon unsealing. Thus, a tensile breaking strength of 5 to 20 MPa and a tensile break elongation not larger than 600% are preferable.

An unsealing strength between the cover material 1 and the container is preferably 1 to 15 N/15 mm when the ease of unsealing is considered. The adhesive strength becomes inferior when the unsealing strength is smaller than 1 N/15 mm, and the ease of unsealing becomes inferior when the unsealing strength is larger than 15 N/15 mm.

EXAMPLES

In the following, although the present invention will be described in further detail through the following Examples, the present invention is not limited only to these Examples.

Example 1

Figure 3:
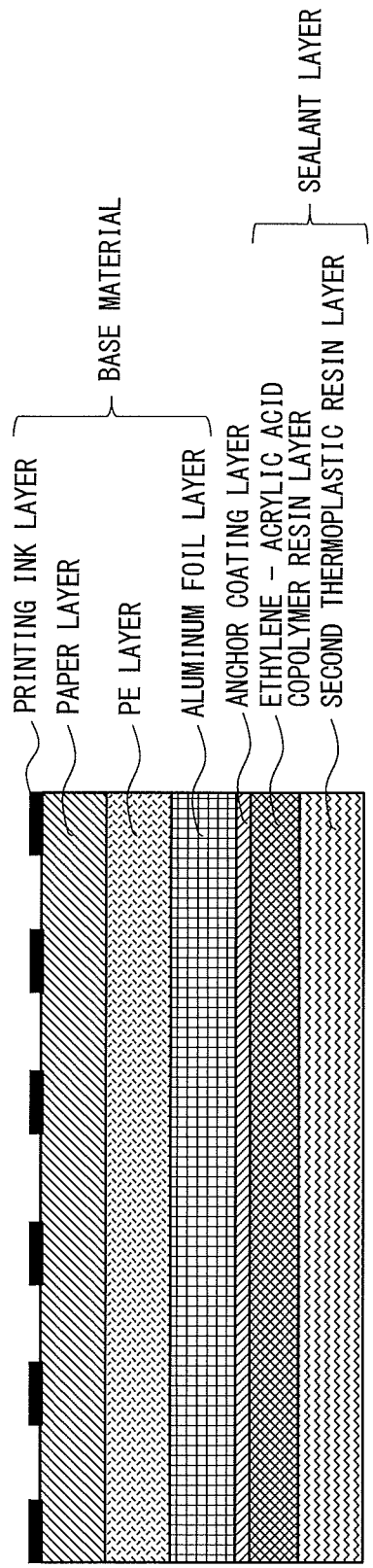
FIG. 3 is a cross-sectional schematic diagram showing a layer configuration of a cover material according to Example 1.

FIG. 3 is a cross-sectional schematic diagram showing a layer configuration of a cover material according to Example 1.

Base Material

A base material having a layer configuration of printing ink layer/paper layer/polyethylene layer/aluminum foil layer was used.

Formation of Sealant Layer

As a forming material of the first thermoplastic resin layer, an ethylene-acrylic acid copolymer was used; and, as a forming material of the second thermoplastic resin layer, a blend resin obtained by mixing a linear low density polyethylene (density: 0.910 g/cm$^3$, MFR: 20 g/10 min), a low density polyethylene (melting point: 105° C., MFR: 25 g/10 min), and a polybutene-1 respectively at a weight ratio of 30 wt %, 40 wt %, and 30 wt % was used. An anchor coating layer was disposed on an aluminium foil of the base material, and the forming material of the first thermoplastic resin layer and the forming material of the second thermoplastic resin layer were co-extruded to form a sealant layer. The film thickness of the first thermoplastic resin layer and the film thickness of the second thermoplastic resin layer were both set to 15 μm.

Example 2

Figure 4:
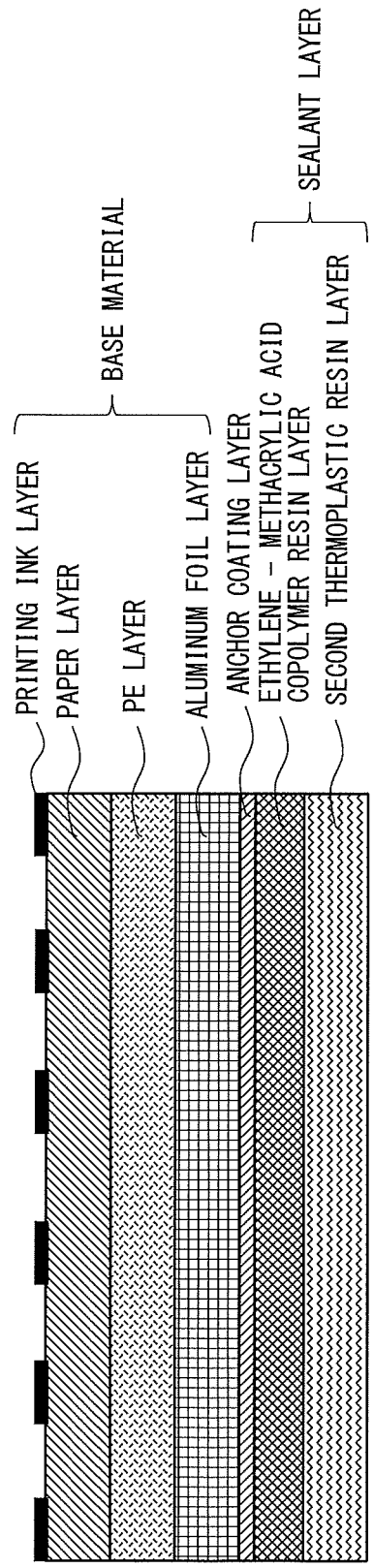
FIG. 4 is a cross-sectional schematic diagram showing a layer configuration of a cover material according to Example 2.

FIG. 4 is a cross-sectional schematic diagram showing a layer configuration of a cover material according to Example 2.

Base Material

A base material similar to that in Example 1 was used.

Formation of Sealant Layer

As a forming material of the first thermoplastic resin layer, an ethylene-methacrylic acid copolymer was used; and, as a forming material of the second thermoplastic resin layer, a blend resin obtained by mixing a linear low density polyethylene (density: 0.905 g/cm$^3$, MFR: 15 g/10 min), a low density polyethylene (melting point: 100° C., MFR: 15 g/10 min), and a polybutene-1 respectively at a weight ratio of 20 wt %, 50 wt %, and 30 wt % was used. An anchor coating layer was disposed on an aluminium foil of the base material, and the forming material of the first thermoplastic resin layer and the forming material of the second thermoplastic resin layer were co-extruded to form a sealant layer. The film thickness of the first thermoplastic resin layer and the film thickness of the second thermoplastic resin layer were both set to 15 μm.

Example 3

Figure 5:
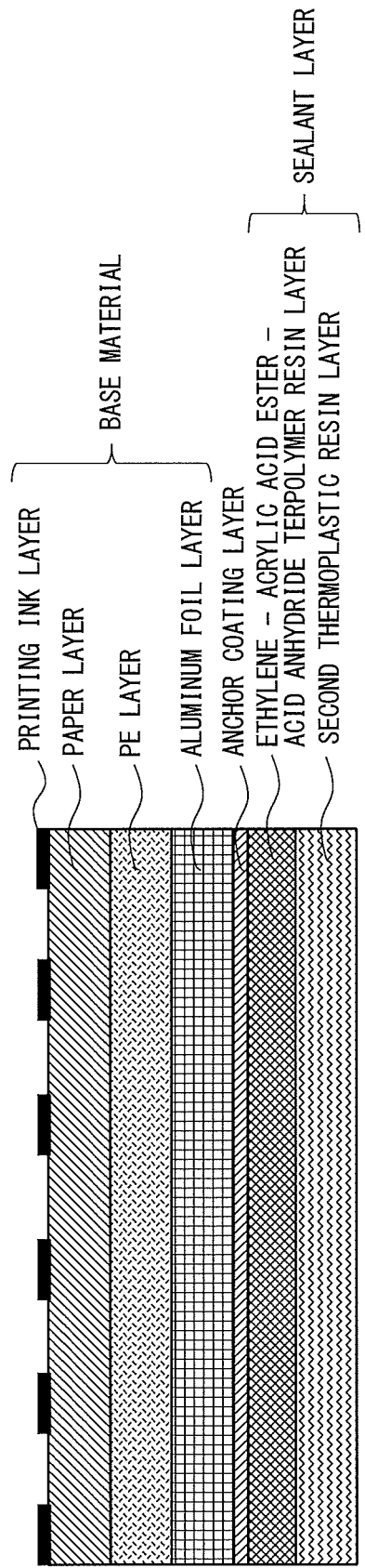
FIG. 5 is a cross-sectional schematic diagram showing a layer configuration of a cover material according to Example 3.

FIG. 5 is a cross-sectional schematic diagram showing a layer configuration of a cover material according to Example 3.

Base Material

A base material similar to that in Example 1 was used.

Formation of Sealant Layer

As a forming material of the first thermoplastic resin layer, an ethylene-acrylic acid ester-acid anhydride ternary copolymer was used; and, as a forming material of the second thermoplastic resin layer, a blend resin obtained by mixing a linear low density polyethylene (density: 0.915 g/cm$^3$, MFR: 30 g/10 min), a low density polyethylene (melting point: 115° C., MFR: 40 g/10 min), and a polybutene-1 respectively at a weight ratio of 20 wt %, 40 wt %, and 20 wt % was used. An anchor coating layer was disposed on an aluminium foil of the base material, and the forming material of the first thermoplastic resin layer and the forming material of the second thermoplastic resin layer were co-extruded to form a sealant layer. The film thickness of the first thermoplastic resin layer was set to 5 μm, and the film thickness of the second thermoplastic resin layer was set to 15 μm.

Example 4

Figure 6:
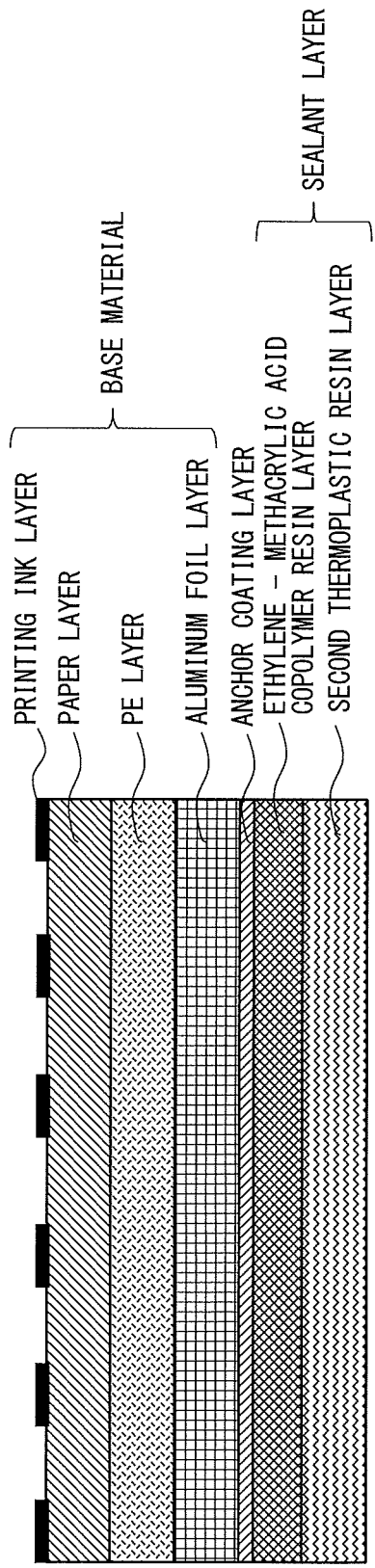
FIG. 6 is a cross-sectional schematic diagram showing a layer configuration of a cover material according to Example 4.

FIG. 6 is a cross-sectional schematic diagram showing a layer configuration of a cover material according to Example 4.

Base Material

A base material similar to that in Example 1 was used.

Formation of Sealant Layer

As a forming material of the first thermoplastic resin layer, an ethylene-methacrylic acid copolymer was used; and, as a forming material of the second thermoplastic resin layer, a blend resin obtained by mixing a linear low density polyethylene (density: 0.915 g/cm$^3$, MFR: 30 g/10 min), a low density polyethylene (melting point: 115° C., MFR: 40 g/10 min), and a polybutene-1 respectively at a weight ratio of 10 wt %, 60 wt %, and 10 wt % was used. An anchor coating layer was disposed on an aluminium foil of the base material, and the forming material of the first thermoplastic resin layer and the forming material of the second thermoplastic resin layer were co-extruded to form a sealant layer. The film thickness of the first thermoplastic resin layer was set to 15 µm, and the film thickness of the thermoplastic resin layer was set to 15 µm.

Example 5

Figure 7:
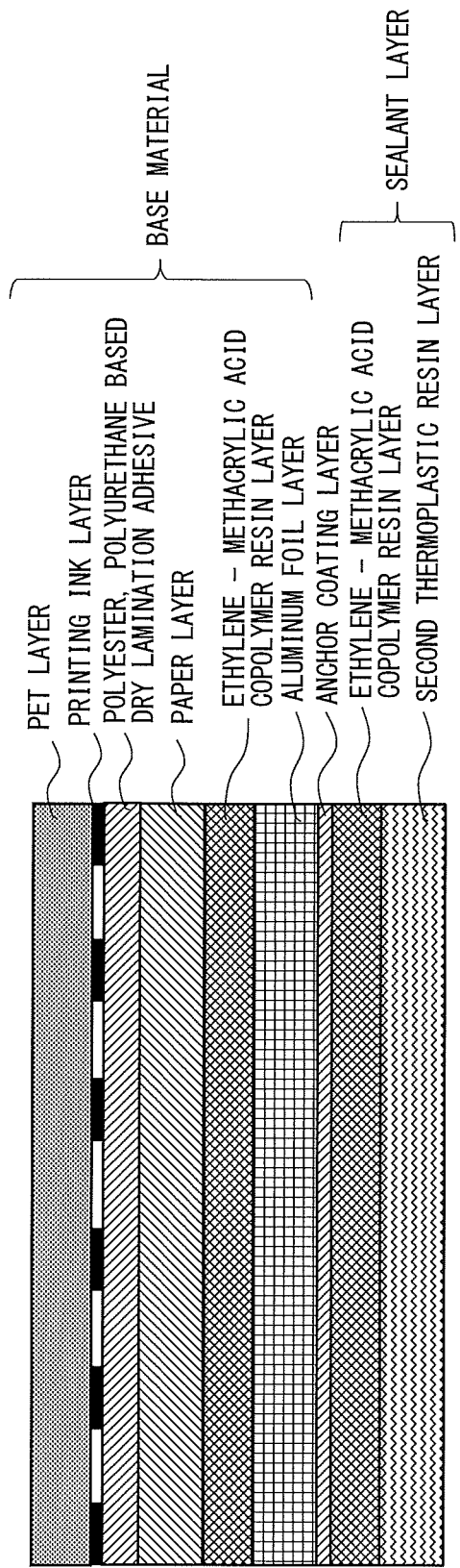
FIG. 7 is a cross-sectional schematic diagram showing a layer configuration of a cover material according to Example 5.

FIG. 7 is a cross-sectional schematic diagram showing a layer configuration of a cover material according to Example 5.

Base Material

The base material that was used had a layer configuration of PET layer/printing ink layer/paper layer/ethylene-methacrylic acid copolymer resin layer/aluminum foil layer; and the paper layer and the PET layer having the printing ink layer disposed thereon were laminated via a polyester, polyurethane based dry lamination adhesive.

The base material that was used had a layer configuration of PET layer/printing ink layer/paper layer/ethylene-methacrylic acid copolymer resin layer/aluminum foil layer; and the paper layer and the PET layer having the printing ink layer disposed thereon were laminated via a polyester, polyurethane based dry lamination adhesive.

Formation of Sealant Layer

As a forming material of the first thermoplastic resin layer, an ethylene-methacrylic acid copolymer was used; and, as a forming material of the second thermoplastic resin layer, a blend resin obtained by mixing a linear low density polyethylene (density: 0.910 g/cm$^3$, MFR: 20 g/10 min), a low density polyethylene (melting point: 105° C., MFR: 25 g/10 min), and a polybutene-1 respectively at a weight ratio of 30 wt %, 40 wt %, and 30 wt % was used. An anchor coating layer was disposed on an aluminium foil of the base material, and the forming material of the first thermoplastic resin layer and the forming material of the second thermoplastic resin layer were co-extruded to form a sealant layer. The film thickness of the first thermoplastic resin layer and the film thickness of the second thermoplastic resin layer were both set to 10 µm.

Example 6

Figure 8:
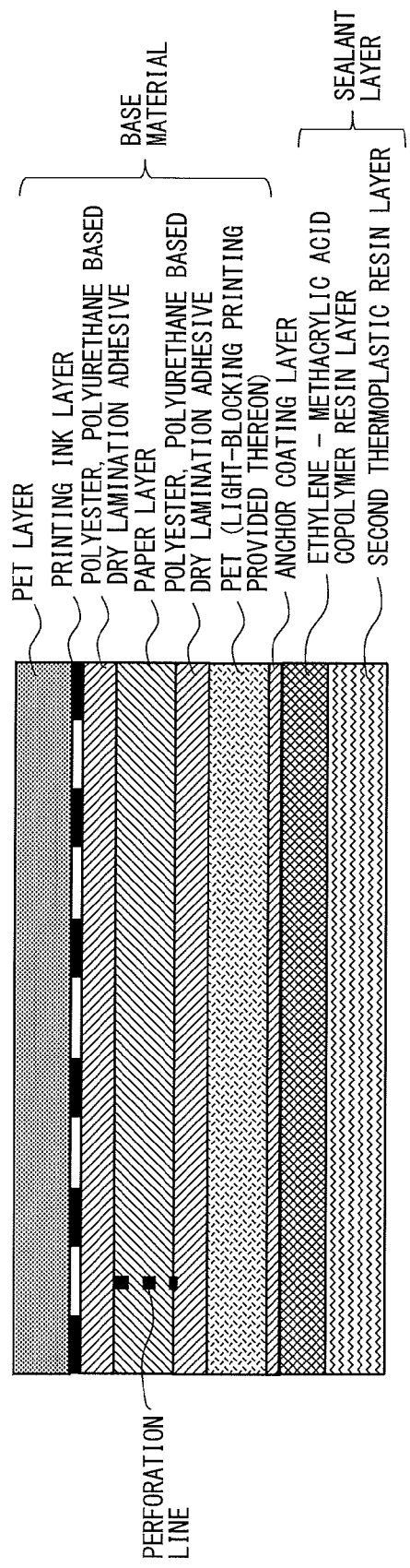
FIG. 8 is a cross-sectional schematic diagram showing a layer configuration of a cover material according to Example 6.

FIG. 8 is a cross-sectional schematic diagram showing a layer configuration of a cover material according to Example 6.

A base material that was used had a layer configuration of PET layer/printing ink layer/paper layer/PET layer having provided thereon light-blocking printing, and was obtained by laminating a PET layer having disposed thereon the printing ink layer and the paper layer, and a PET layer having provided thereon the light-blocking printing and a paper layer using the polyester, polyurethane based dry lamination adhesive. In addition, on the paper layer, a perforation line for enabling partial detachment between the paper layer and the PET layer thereabove was formed.

Formation of Sealant Layer

As a forming material of the first thermoplastic resin layer, an ethylene-methacrylic acid copolymer was used; and, as a forming material of the second thermoplastic resin layer, a blend resin obtained by mixing a linear low density polyethylene (density: 0.910 g/cm$^3$, MFR: 20 g/10 min), a low density polyethylene (melting point: 105° C., MFR: 25 g/10 min), and a polybutene-1 respectively at a weight ratio of 30 wt %, 40 wt %, and 30 wt % was used. An anchor coating layer was disposed on the PET layer having provided thereon light-blocking printing of the base material, and the forming material of the first thermoplastic resin layer and the forming material of the second thermoplastic resin layer were co-extruded to form a sealant layer. The film thickness of the first thermoplastic resin layer and the film thickness of the second thermoplastic resin layer were both set to 10 µm.

Comparative Example 1

Figure 9:
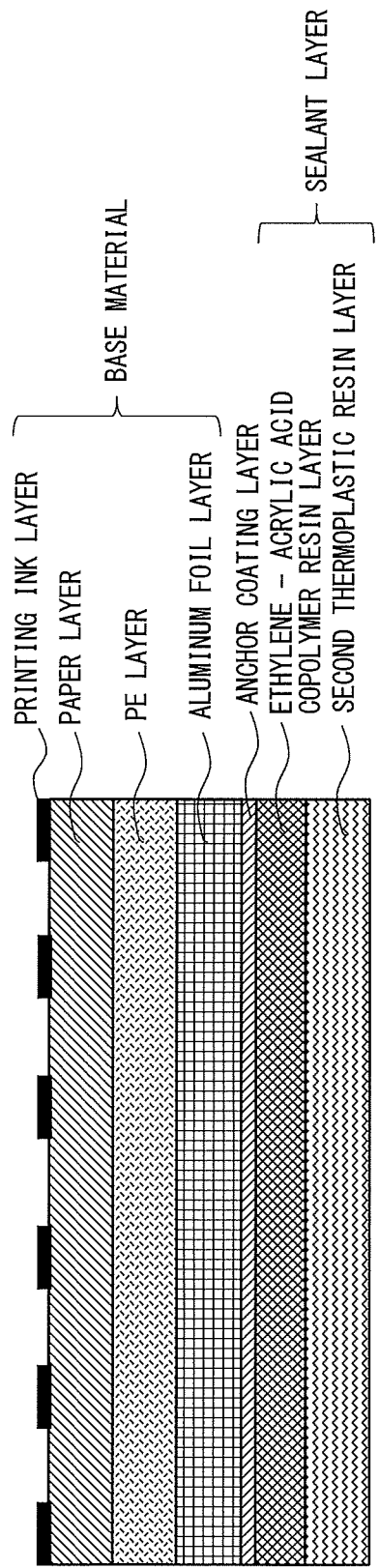
FIG. 9 is a cross-sectional schematic diagram showing a layer configuration of a cover material according to Comparative Example 1.

FIG. 9 is a cross-sectional schematic diagram showing a layer configuration of a cover material according to Comparative Example 1.

Base Material

A base material similar to that in Example 1 was used.

Formation of Sealant Layer

As a forming material of the first thermoplastic resin layer, an ethylene-acrylic acid copolymer was used; and, as a forming material of the second thermoplastic resin layer, a blend resin obtained by mixing a linear low density polyethylene (density: 0.910 g/cm$^3$, MFR: 20 g/10 min), a low density polyethylene (melting point: 105° C., MFR: 25 g/10 min), and a polybutene-1 respectively at a weight ratio of 45 wt %, 50 wt %, and 5 wt % was used. An anchor coating layer was disposed on an aluminium foil of the base material, and the forming material of the first thermoplastic resin layer and the forming material of the second thermoplastic resin layer were co-extruded to form a sealant layer. The film thickness of the first thermoplastic resin layer and the film thickness of the second thermoplastic resin layer were both set to 15 µm.

Comparative Example 2

Figure 10:
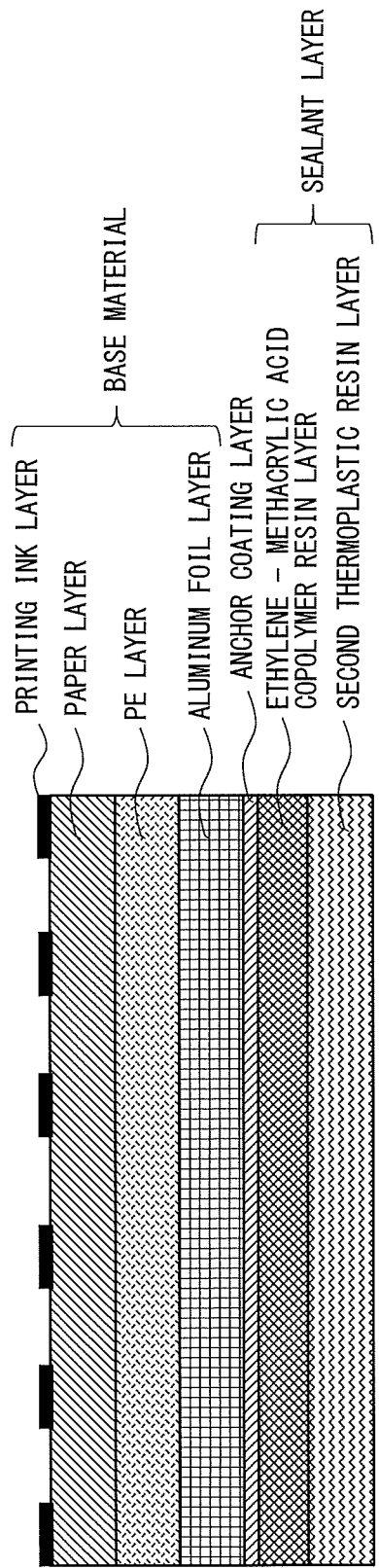
FIG. 10 is a cross-sectional schematic diagram showing a layer configuration of a cover material according to Comparative Example 2.

FIG. 10 is a cross-sectional schematic diagram showing a layer configuration of a cover material according to Comparative Example 2.

Formation of Base Material

A base material similar to that in Example 1 was used.

Formation of Sealant Layer

As a forming material of the first thermoplastic resin layer, an ethylene-methacrylic acid copolymer was used; and, as a forming material of the second thermoplastic resin layer, a blend resin obtained by mixing a linear low density polyethylene (density: 0.910 g/cm$^3$, MFR: 20 g/10 min), a low density polyethylene (melting point: 105° C., MFR: 25 g/10 min), and a polybutene-1 respectively at a weight ratio of 25 wt %, 25 wt %, and 50 wt % was used. An anchor coating layer was disposed on an aluminium foil of the base material, and the forming material of the first thermoplastic resin layer and the forming material of the second thermoplastic resin layer were co-extruded to form a sealant layer. The film thickness of the first thermoplastic resin layer and the film thickness of the second thermoplastic resin layer were both set to 15 μm.

The following measurements and evaluations were performed using the cover materials having the layer configurations shown in FIGS. 3 to 10 obtained from Examples 1 to 6 and Comparative Examples 1 and 2.

Measurement of Seal Strength

The cover materials obtained above were heat-sealed at 130 to 160° C. to a container having a seal part covered with a polypropylene resin, and heat-seal strengths were measured. The seal pressure was set to 0.15 MPa and the sealing time was set to 1 second. By using the container heat-sealed with each of the cover materials, a 90-degree peel test was performed and the seal strength was measured.

Evaluation of Stringiness on Peel Surface

Using a container heat-sealed with each of the cover materials in a manner similar to the measurement of the seal strength, stringiness of a peel surface was visually evaluated when the cover material was unsealed by hand.

Evaluation of Sensation Upon Unsealing

Using a container heat-sealed with each of the cover materials in a manner similar to the measurement of the seal strength, the sensation upon unsealing was evaluated when the cover material was unsealed by hand.

Table 1 shows the measurement results of seal strength, and the evaluation results of stringiness of a peel surface and the sensation upon unsealing.

TABLE 1

|  | Seal Strength | Stringiness of Peel Surface | Sensation Upon Unsealing |
|---|---|---|---|
| Example 1 | Δ | ○ | Δ |
| Example 2 | Δ | ○ | ○ |
| Example 3 | ○ | ○ | ○ |
| Example 4 | ○ | ○ | Δ |
| Example 5 | Δ | ○ | ○ |
| Example 6 | Δ | ○ | ○ |
| Comparative Example 1 | x | ○ | x |
| Comparative Example 2 | x | x | x |

○: Excellent
Δ: Slightly good
x: Inferior

From Table 1, when compared to the cover materials obtained in Comparative Examples 1 and 2; the cover materials obtained in Examples 1 to 6 had shown a satisfactory strong adhesion between the cover material and the container, and were each confirmed to be a cover material providing the ease of unsealing. Furthermore, when compared to the cover materials obtained in Comparative Examples 1 and 2, the cover materials obtained in Examples 1 to 6 also enabled reduction in occurrence of stringiness upon unsealing, and were confirmed to be excellent also for the sensation upon unsealing.

INDUSTRIAL APPLICABILITY

The present invention is useful as a container formed from a polypropylene resin or a cover material used for a container having a seal part covered with a polypropylene resin.

DESCRIPTION OF THE REFERENCE CHARACTERS 1 cover material
2 base material
3 printing ink layer
4 paper layer
5 adhesion resin layer
6 metallic foil layer
7 sealant layer
8 first thermoplastic resin layer
9 first thermoplastic resin
10 second thermoplastic resin
11 second thermoplastic resin layer
12 anchor coating layer

The invention claimed is:

1. A cover material used for a container formed from a polypropylene resin or a container having a seal part formed from a polypropylene resin, the cover material comprising
   a base material and a sealant layer,
   the sealant layer having a laminated structure obtained through lamination of a layer of a first thermoplastic resin having adhesiveness with respect to the base material, and a layer of a second thermoplastic resin having adhesiveness with respect to the seal part formed from the polypropylene resin,
   thicknesses of the layer of the first thermoplastic resin and the layer of the second thermoplastic resin satisfying: a thickness of the layer of the first thermoplastic resin ≤ a thickness of the layer of the second thermoplastic resin, and
   the layer of the second thermoplastic resin having a dispersion structure obtained by dispersing, in the first thermoplastic resin, the second thermoplastic resin that is non-compatible or partially compatible with respect to the first thermoplastic resin such that a ratio l/s of a domain longer diameter l and a domain shorter diameter s of the second thermoplastic resin falls in a range of $1.5 \leq l/s \leq 10$.

2. The cover material according to claim 1, wherein the base material includes a paper layer, a printing ink layer formed on one surface of the paper layer, and a metallic foil layer laminated on the other surface via an adhesion resin layer.

3. The cover material according to claim 2, wherein an anchor coating layer is interposed between the metallic foil layer and the layer of the first thermoplastic resin.

4. The cover material according to claim 1, wherein the base material includes a paper layer, a printing ink layer formed on one surface of the paper layer, and a light-blocking layer laminated on the other surface via an adhesion resin layer.

5. The cover material according to claim 1, wherein:
   the layer of the first thermoplastic resin is formed from at least one type of resin selected from the group consisting of ethylene-acrylic acid copolymers, ethylene-methacrylic acid copolymers, ethylene-acrylic acid-acrylic acid ester terpolymer resins, ethylene-methacrylic acid-acrylic acid ester terpolymer resins, ethylene-acrylic acid-methacrylic acid ester terpolymer resins, ethylene-methacrylic acid-methacrylic acid ester terpolymer resins, ethylene-acrylic acid ester-acid anhydride terpolymer resins, and ethylene-methacrylic acid ester-acid anhydride terpolymer resins; and
   the layer of the second thermoplastic resin includes a blend resin containing a linear low density polyethylene by 10 to 30 wt % and a low density polyethylene by 40 to 60 wt % as the first thermoplastic resin, and a polybutene-1 by 10 to 30 wt % as the second thermoplastic resin.

6. The cover material according to claim 5, wherein:
the linear low density polyethylene has a density of 0.900 to 0.915 g/cm$^3$ and a melt flow rate (MFR) of 5 to 30 g/10 min; and
the low density polyethylene has a melting point of 100 to 115° C. and an MFR of 15 to 40 g/10 min.

7. The cover material according to claim 1, wherein the layer of the second thermoplastic resin further contains an elastomer as a peel strength regulator.

8. The cover material according to claim 7, wherein the elastomer added as the peel strength regulator is an ethylene-butene copolymer.

9. The cover material according to claim 1, wherein the sealant layer is laminated on the base material through co-extrusion lamination.

* * * * *